(12) United States Patent
Bell et al.

(10) Patent No.: US 8,444,751 B2
(45) Date of Patent: May 21, 2013

(54) DEAERATOR AND CONDUIT ASSEMBLY

(75) Inventors: Melissa A. Bell, San Diego, CA (US); Christine Ingrid Schade, San Diego, CA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 69 days.

(21) Appl. No.: 13/162,884

(22) Filed: Jun. 17, 2011

(65) Prior Publication Data
US 2012/0318912 A1    Dec. 20, 2012

(51) Int. Cl.
*B01D 19/00* (2006.01)
(52) U.S. Cl.
USPC .............. 95/261; 96/187; 96/212; 184/6.23
(58) Field of Classification Search
USPC .............. 96/187, 212, 209, 210, 211; 95/261; 184/6.23
See application file for complete search history.

(56) References Cited

U.S. PATENT DOCUMENTS

| | | | |
|---|---|---|---|
| 2,316,729 A * | 4/1943 | Tryon | 96/212 |
| 2,572,527 A | 10/1951 | Sebald | |
| 2,695,679 A * | 11/1954 | Hoffman et al. | 96/205 |
| 2,705,053 A | 3/1955 | Morris | |
| 2,725,956 A | 12/1955 | Cunningham | |
| 2,755,888 A * | 7/1956 | Cunningham | 184/6.3 |
| 2,983,331 A | 5/1961 | Helsley | |
| 3,130,022 A * | 4/1964 | Clark | 96/187 |
| 3,768,726 A | 10/1973 | Hale et al. | |
| 4,282,016 A * | 8/1981 | Tauber et al. | 96/212 |
| 4,511,016 A * | 4/1985 | Doell | 184/6.11 |
| 4,600,413 A | 7/1986 | Sugden | |
| 4,715,869 A | 12/1987 | Ramshaw | |
| 4,755,197 A | 7/1988 | Benson et al. | |
| 4,793,440 A | 12/1988 | Iseman | |
| 4,947,963 A | 8/1990 | Aho, Jr. | |
| 4,962,829 A | 10/1990 | Sugden | |
| 5,085,677 A | 2/1992 | Ville et al. | |
| 5,587,068 A | 12/1996 | Aho, Jr. et al. | |
| 6,348,087 B1 | 2/2002 | Aslin | |
| 7,013,905 B2 | 3/2006 | Jones et al. | |
| 7,713,335 B2 * | 5/2010 | Ringenberger et al. | 95/261 |
| 2001/0002596 A1 | 6/2001 | Menu et al. | |

FOREIGN PATENT DOCUMENTS

| | | |
|---|---|---|
| DE | 19747966 | 5/1999 |
| EP | 1166841 | 1/2002 |

OTHER PUBLICATIONS

European Search Report dated Sep. 28, 2012 for European Application No. 12170965.3.

* cited by examiner

*Primary Examiner* — Duane Smith
*Assistant Examiner* — Douglas Theisen
(74) *Attorney, Agent, or Firm* — Carlson, Gaskey & Olds PC

(57) ABSTRACT

An example deaerator assembly includes a housing having a housing inlet and a housing outlet. A conduit configured to communicate a deaerated coolant is located within the housing. A mixture of coolant and air is deaerated as the mixture is communicated from the housing inlet to the housing outlet within the housing and outside the conduit.

20 Claims, 2 Drawing Sheets

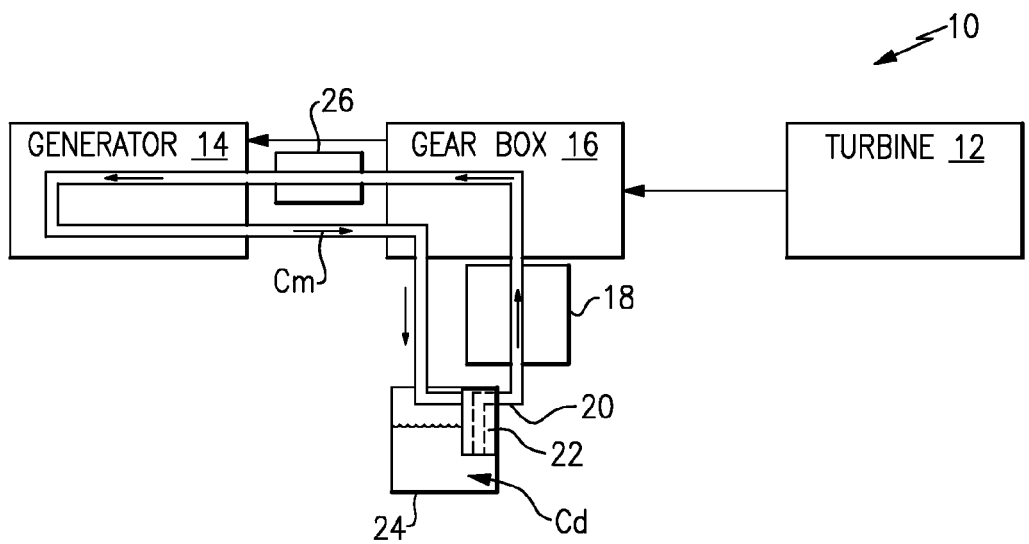
FIG.1
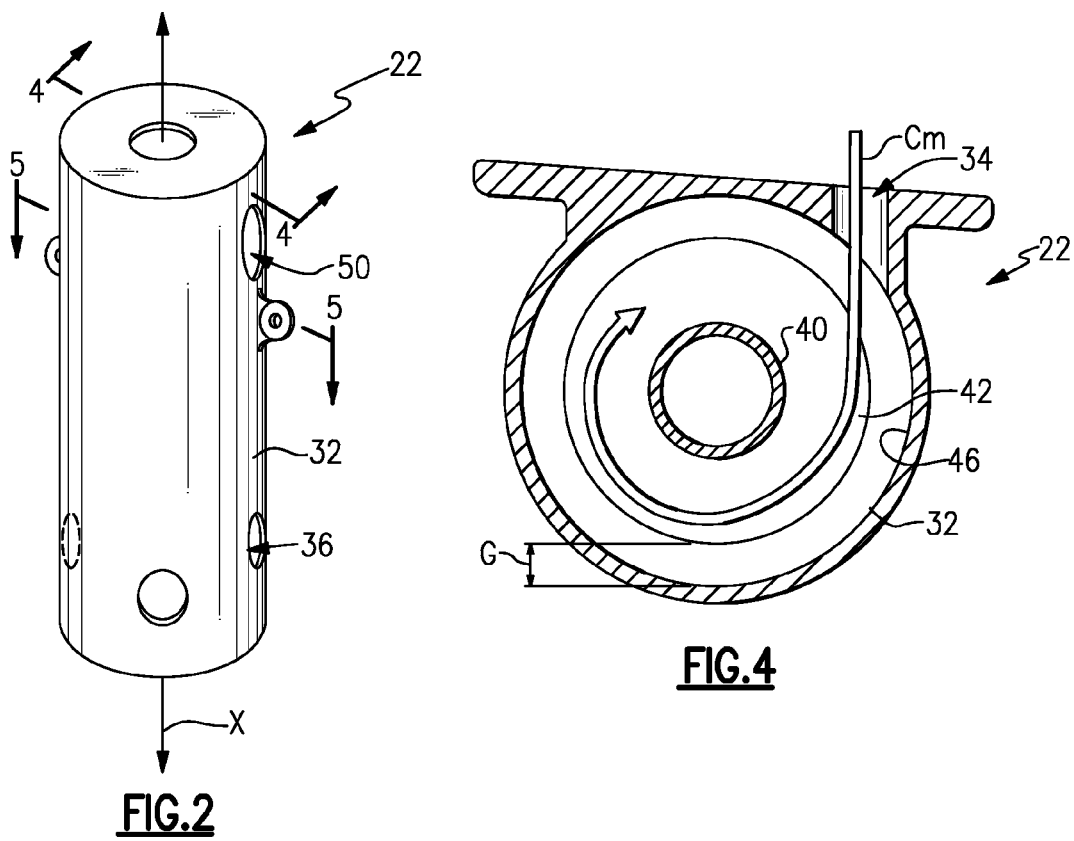
FIG.2
FIG.4

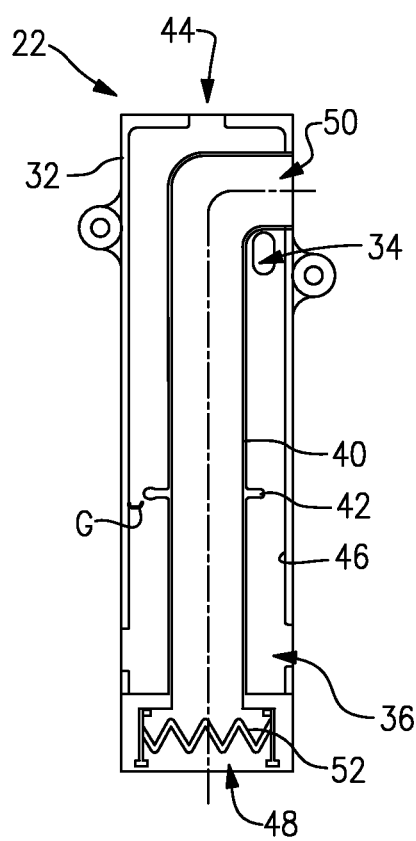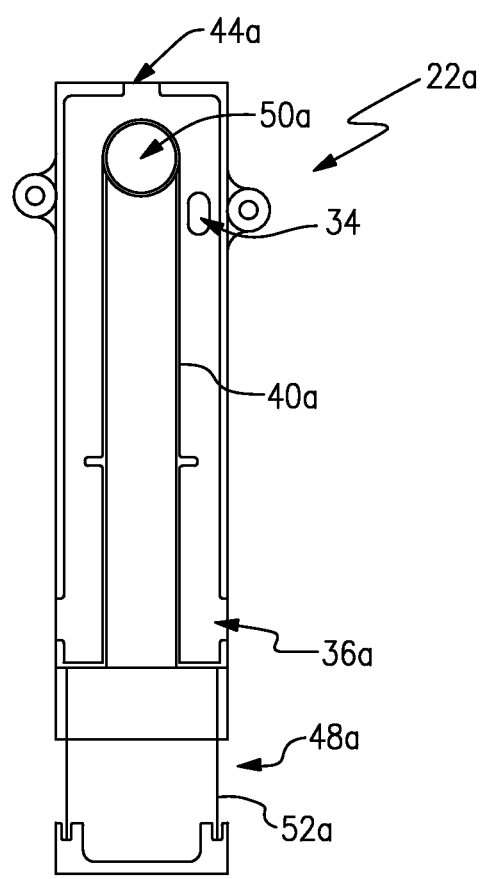

DEAERATOR AND CONDUIT ASSEMBLY

BACKGROUND

This disclosure relates generally to a deaerator and, more particularly, to a deaerator and conduit assembly.

Generators provide electric power as is known. Aircraft auxiliary power units, for example, typically include a generator that is driven by a turbine of a turbine engine. The turbine is rotatably coupled to the generator through a gearbox. Coolant, such as oil, is circulated through the gearbox and the generator. The coolant removes thermal energy and lubricates various components.

Coolant mixes with air as the coolant circulates through the generator. As known, at least some of the air must be separated from the coolant before the coolant can be reintroduced to the gearbox and the generator. Deaerators are used to separate air from the coolant. The coolant is collected within a sump after the deaerator removes the air. The coolant is recirculated through the gearbox and the generator from the sump. The coolant is communicated to the gearbox and the generator through an inlet tube that is separate from the deaerator.

SUMMARY

An example deaerator assembly includes a housing having a housing inlet and a housing outlet. A conduit configured to communicate a deaerated coolant is located within the housing. A mixture of coolant and air is deaerated as the mixture is communicated from the housing inlet to the housing outlet within the housing and outside the conduit.

An example aircraft auxiliary power unit assembly includes a gearbox configured to rotatably couple a turbomachine to a generator, and a coolant path that communicates a coolant through the gearbox and the generator. A deaerator assembly has a deaerating member. A mixture of air and the coolant is communicated about the deaerating member to separate air from the coolant. The deaerating member communicates the coolant along a portion of the coolant path.

An example method of communicating deaerated coolant includes communicating a mixture of air and coolant relative to a deaerating member into a sump. The method also includes communicating deaerated coolant from the sump using the deaerating member.

BRIEF DESCRIPTION OF THE FIGURES

The various features and advantages of the disclosed examples will become apparent to those skilled in the art from the detailed description. The figures that accompany the detailed description can be briefly described as follows:

FIG. 1 shows a schematic view of an example auxiliary power unit and associated coolant path.

FIG. 2 shows a perspective view of an example deaerator used in the FIG. 1 auxiliary power unit.

FIG. 3 shows a section view at line 4-4 of FIG. 2.

FIG. 4 shows a section view at line 5-5 of FIG. 2.

FIG. 5 shows a section view of another example deaerator suitable for use in the FIG. 1 auxiliary power unit.

DETAILED DESCRIPTION

Referring to FIG. 1, an example auxiliary power unit arrangement 10 includes a turbine 12 of a turbomachine. The turbine 12 is rotatably coupled to a generator 14 through a gearbox 16. A pump 18 circulates a coolant, such as a lubricating and cooling oil, along a coolant path 20. The coolant cools and lubricates portions of the generator 14 and the gearbox 16.

The coolant mixes with air when circulating through the generator 14 and the gearbox 16. Coolant mixed with a substantial amount of air is considered $C_m$ in this example. The coolant $C_m$ is not suitable for direct recirculation back to the gearbox 16 and the generator 14 because the coolant $C_m$ contains the substantial amount of air.

The example arrangement 10 includes a deaerator assembly 22. The coolant $C_m$ is communicated through the deaerator 22 to remove at least some of the air. A sump 24 collects the deaerated coolant $C_d$ exiting the deaerator 22. The deaerated coolant $C_d$ is suitable for direct recirculation back to the gearbox 16 and the generator 14 because the deaerated coolant $C_d$ does not contain a substantial amount of air. Notably, the deaerated coolant $C_d$ communicates back through the deaerator 22 when leaving the sump 24. Thus, no conduit separate from the deaerator 22 is needed to move deaerated coolant $C_d$ from the sump 24.

The deaerated coolant $C_d$ may move through a chiller 26 along some portion of the coolant path 20. Although the pump 18, the deaerator 22, the sump 24, and the chiller 26 are schematically shown as separate from the gearbox 16, some or all of these components may be disposed within the gearbox 16.

Referring to FIGS. 2-5 with continuing reference to FIG. 1, the example deaerator 22 includes a deaerator housing 32 that is generally cylindrical and extends along an axis X. The example deaerator housing 32 establishes an inlet 34 and a plurality of outlets 36. The coolant $C_m$ communicates into the deaerator 22 through the inlet 34. Air is removed from the coolant $C_m$ within the deaerator 22. The outlets 36 then communicate the deaerated coolant $C_d$ from the deaerator 22 into the sump 24. The outlets 36 are positioned vertically below the inlet 34 in this example. The inlet 34 and the outlets 36 are radially facing. Other numbers of the inlet 34 and the outlets 36 could be used in other examples.

The deaerator 22 includes a deaerating member 40. The deaerating member has a pedestal 42. The deaerating member 40 is disposed within an interior of the deaerator housing 32 and aligned coaxially with the axis X. The example deaerator 22 and deaerating member 40 are aluminum, but may be other materials in other examples.

The inlet 34 of the deaerator 22 has a generally oval profile and is established within the deaerator housing 32 such that the coolant $C_m$ is communicated into the deaerator housing 32 in a manner that encourages a spiraling movement of the coolant $C_m$ about the deaerating member 40. That is, the coolant $C_m$ is not communicated through the inlet 34 directly toward the axis X.

After the coolant $C_m$ moves through the inlet 34 into the interior of the deaerator housing 32, the mixture spirals around the deaerating member 40 toward the pedestal 42. As the coolant $C_m$ spirals, centrifugal force tends to separate the coolant from the air. The coolant tends to move away from the axis X, and the air tends to move toward the axis X. The air that has been separated from the coolant $C_m$ exits the deaerator housing 32 through a vent 44 established in the deaerator housing 32. The coolant $C_m$ gradually includes less of the air as the coolant $C_m$ spirals vertically downward toward the pedestal 42.

After moving vertically downward a sufficient amount, the coolant $C_m$ is forced through a gap G established between the pedestal 42 and an inner wall 46 of the deaerator housing 32. Moving the coolant $C_m$ through the gap G separates some of the remaining air from the coolant $C_m$. The air that has been separated from the coolant $C_m$ due to movement through the gap G also exits the deaerator housing 32 through the vent 44 established in the deaerator housing 32.

After moving through the gap G, the coolant $C_m$, which now includes considerably less of the air A than when the coolant $C_m$ was moved into the deaerator 22, is considered deaerated coolant $C_d$ and suitable for recirculation through the gearbox 16 and the generator 14. The deaerator 22 may not remove all of the air A from the coolant $C_m$, but the deaerator 22 removes enough of the air A from the coolant $C_m$ so that the coolant is suitable for recirculation as deaerated coolant $C_d$. A person having skill in this art and the benefit of this disclosure would understand how much of the air A must be removed from the coolant $C_m$ before the coolant $C_m$ can be considered deaerated coolant $C_d$ that is suitable for recirculation.

The example deaerating member 40 is a conduit that extends between an inlet 48 and an outlet 50. The inlet 48 is positioned vertically below the outlets 36. The inlet 48 is configured to be submerged within the coolant $C_d$ that is collected within the sump 24. During operation of the deaerator 22, the coolant $C_d$ is pulled into the inlet 48. The level of deaerated coolant $C_d$ within the sump 24 is typically kept at a level that is vertically above both the inlet 48 and the outlets 36.

The deaerating member 40 communicates the coolant $C_d$ from the inlet 48 to the outlet 50. The deaerating member 40 delivers the deaerated coolant $C_d$ from sump 24. Since the deaerating member 40 forms a portion of the coolant path 20, no separate conduit is required to deliver the deaerated coolant $C_d$ from the sump 24.

Generally, air is removed from the coolant $C_m$ as the coolant $C_m$ communicates downward through an annular chamber established between the deaerator housing 32 and the deaerating member 40. The coolant $C_m$ moves along a first flow path.

The deaerated coolant $C_d$ communicates upward through the deaerating member 40 inside the annular chamber and along a second, different flow path. In this example, the coolant $C_m$ communicates downward at the same time as the deaerated coolant $C_d$ communicates upward. In another example, the coolant $C_m$ communicates downward and the deaerated coolant $C_d$ communicates upward at different times.

In this example, the inlet 48 is established in the bottom axially-facing surface of the deaerator 22. A screen 52 may cover the inlet 48 to block contaminates and debris from moving through the deaerating member 40 and into the pump 18. The example screen 52 has a wavy cross-section.

The outlet 50 of the example deaerating member 40 is established in a sidewall of the deaerator housing 32. The outlet 50 faces radially outward away from the axis X. Positioning the outlet 50 in the sidewall of the deaerator housing 32 provides room for the vent 44.

The example outlet 50 is also positioned vertically above the inlet 34. Accordingly, the radially oriented portion of the deaerating member 40 does not significantly interfere with the spiraling movement of the coolant $C_m$.

Referring to FIG. 5 with continuing reference to FIG. 1, another example deaerator 22a may include radially facing inlets 48a to a deaerating member 40a that communicate the deaerated coolant $C_d$ from the sump 24 through an outlet 50a. At least one screen 52a covers these inlets 48a. The screen 52a is relatively planar and does not have a wavy cross-section.

Air communicates from the example deaerating member 40a through a vent 44a, and deaerated coolant $C_d$ is communicated to the sump 24 through a plurality of outlets 36a.

Features of the disclosed examples include a deaerator that is able to deliver deaerated coolant from the sump. Accordingly, no separate conduit from the sump is needed.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. A deaerator assembly comprising:
   a housing having a housing inlet and a housing outlet; and
   a conduit configured to communicate a deaerated coolant from a sump, the conduit located within the housing, wherein a mixture of coolant and air is deaerated as the mixture is communicated from the housing inlet to the housing outlet within the housing and outside the conduit, the mixture of coolant and air communicated about the conduit to separate air from the coolant.

2. The deaerator assembly of claim 1, wherein the mixture moves along a first flow path between the housing inlet and the housing outlet, and the conduit is configured to communicate deaerated coolant along a second flow path different than the first flow path.

3. The deaerator assembly of claim 1, wherein the mixture is communicated in a first direction along a first flow path between the housing inlet and the housing outlet, and the conduit is configured to communicate deaerated coolant in a second direction along a second flow path, the first direction opposite the second direction.

4. The deaerator assembly of claim 2, wherein the first flow path is an annular flow path.

5. The deaerator assembly of claim 1, wherein the conduit extends from a conduit inlet to a conduit outlet.

6. The deaerator assembly of claim 5, wherein the conduit inlet comprises an aperture established in an axially facing surface of the housing.

7. The deaerator assembly of claim 6, wherein the conduit inlet is vertically below the housing outlet.

8. The deaerator assembly of claim 6, including a wave screen covering the conduit inlet.

9. The deaerator assembly of claim 5, wherein the conduit inlet is aligned transverse to the conduit outlet.

10. The deaerator assembly of claim 6, wherein the conduit outlet is vertically above the housing inlet.

11. The deaerator assembly of claim 1, wherein the housing inlet is configured to spiral the mixture of air and the coolant about the conduit.

12. The deaerator assembly of claim 1, wherein the housing outlet comprises a plurality of apertures in an outer wall of the housing.

13. The deaerator assembly of claim 1, including a platform extending from the wall of the conduit, the platform configured to deaerate the mixture.

14. The deaerator assembly of claim 1, wherein the coolant comprises a lubricant.

15. An aircraft auxiliary power unit assembly, comprising:
    a gearbox configured to rotatably couple a turbomachine to a generator;
    a coolant path that communicates a coolant through the gearbox and the generator; and
    a deaerator assembly having a deaerating member, wherein a mixture of air and the coolant is communicated about the deaerating member to separate air from the coolant, and the deaerating member communicates the coolant along a portion of the coolant path.

16. The aircraft auxiliary power unit assembly of claim 15, wherein the deaerator assembly includes at least one outlet configured to communicate the coolant to a sump, and the deaerating member includes at least one inlet configured to communicate the coolant from the sump.

17. The aircraft auxiliary power unit assembly of claim 16, wherein the deaerator assembly is positioned within the sump.

18. A method of communicating deaerated coolant, comprising:
   communicating a mixture of air and coolant relative to a deaerating member into a sump; and
   communicating deaerated coolant from the sump using the deaerating member.

19. The method of claim 18, wherein the deaerating member comprises a conduit disposed within a housing and establishing an annular chamber therebetween, and the communicating of the mixture is within the annular chamber.

20. The deaerator assembly of claim 1, wherein the sump is outside the housing.

\* \* \* \* \*